United States Patent
Kim et al.

(10) Patent No.: US 7,604,733 B2
(45) Date of Patent: Oct. 20, 2009

(54) APPARATUS FOR BIOLOGICAL REMOVAL OF PHOSPHORUS AND NITROGEN USING GRANULATED METHANE-OXIDIZING BACTERIA

(75) Inventors: Kwang-Soo Kim, Gyeonggi-do (KR); Hee-Ja Lee, Gyeonggi-do (KR); I-Tae Kim, Gyeonggi-do (KR); Kwang-Ho Ahn, Seoul (KR); Chai-Sung Gee, Seoul (KR); Sung-Youn Kim, Gyeonggi-do (KR); Ji-Seon Yoo, Gyeonggi-do (KR); Eui-Sin Lee, Gyeonggi-do (KR); Sung-Pok Paik, Seoul (KR); Chul-Ki Oh, Gyeonggi-do (KR); Kwang-Yoon Lee, Gyeonggi-do (KR)

(73) Assignees: Korea Institute of Construction Technology, Gyeonggi-Do (KR); Daewoo Engineering & Construction Co., Ltd., Seoul (KR)

( * ) Notice: Subject to any disclaimer, the term of this patent is extended or adjusted under 35 U.S.C. 154(b) by 0 days.

(21) Appl. No.: 12/405,029

(22) Filed: Mar. 16, 2009

(65) Prior Publication Data

US 2009/0173679 A1    Jul. 9, 2009

Related U.S. Application Data

(62) Division of application No. 11/808,386, filed on Jun. 8, 2007, now Pat. No. 7,520,991.

(30) Foreign Application Priority Data

Jun. 8, 2006    (KR) .................... 10-2006-0051523

(51) Int. Cl.
*C02F 3/00* (2006.01)
(52) U.S. Cl. .................... 210/150; 210/151; 210/416.1; 210/500.23; 210/903; 210/906
(58) Field of Classification Search ......... 210/150–151, 210/196, 416.1, 500.23, 903, 906
See application file for complete search history.

(56) References Cited

U.S. PATENT DOCUMENTS

| 5,057,221 A | 10/1991 | Bryant et al. |
| 6,099,731 A | 8/2000 | Uchiyama et al. |
| 7,459,076 B2 | 12/2008 | Cote et al. |

FOREIGN PATENT DOCUMENTS

JP    11-262793    9/1999

OTHER PUBLICATIONS

Williams, Jon Christopher, "Initial Investigations of Aerobic Granulation in an Annular Gap Bioreactor", Raleigh, 2004.

*Primary Examiner*—Chester T Barry
(74) *Attorney, Agent, or Firm*—Venable LLP; Michael A. Sartori; Justine A. Gozzi

(57) ABSTRACT

A biological removal method of phosphorus and nitrogen includes supplying a mixture gas into a gas holder. Inflow water and return water are supplied into the gas holder to make the mixture gas dissolved in the inflow water and the return water. The return water was provided from a granulation biological reaction tank. The inflow water and the return water including the dissolved mixture gas are transported to the granulation biological reaction tank. A nitrogen-based component is removed from the inflow water and the return water using methan-oxidizing bacteria granulated in the granulation biological reaction tank. Treated water without the nitrogen-based component is transported to an anoxic tank for treatment, and discharged from the anoxic tank.

9 Claims, 2 Drawing Sheets

APPARATUS FOR BIOLOGICAL REMOVAL OF PHOSPHORUS AND NITROGEN USING GRANULATED METHANE-OXIDIZING BACTERIA

CROSS-REFERENCE TO RELATED APPLICATIONS

This application is a division of U.S. patent application Ser. No. 11/808,386 filed Jun. 8, 2007, now U.S. Pat. No. 7,520, 991.

The present invention claims priority of Korean patent application number 10-2006-51523, filed on Jun. 8, 2006, which is incorporated by reference in its entirety.

BACKGROUND OF THE INVENTION

The present invention relates to a method for biologically removing phosphorus and nitrogen and an apparatus therefor, more particularly, to a method for biologically removing phosphorus and nitrogen using granulated methan-oxidizing bacteria and an apparatus therefor.

In general, an apparatus for biologically removing phosphorus and nitrogen using suspended microbes includes an anaerobic tank, an anoxic tank, an aeration tank, and a settling tank. In the anaerobic tank, phosphorus inside cells is released, and nitrate-nitrogen or nitrite-nitrogen is reduced to nitrogen gas and removed in the anoxic tank. The aeration tank removes organic materials, oxidizes nitrogen-based components such as nitrate-nitrogen, and excessively takes phosphorus released from the anaerobic tank. The settling tank settles the suspended microbes so as to separate treated water and the microbes from each other. This type of apparatus removes phosphorus by repeating sequential anaeration and aeration processes in which sludge in the anaerobic tank undergoes the anoxic tank, flows into the aeration tank, and returning to the anaerobic tank. Also, processes of removing oxygen from sludge and exposing the sludge to air need to be performed repeatedly to remove nitrogen.

High concentration of organic materials expressed by biological oxygen demand (BOD) or chemical oxygen demand (COD) in inflow water is necessary for easy proceeding in releasing phosphorus and removing nitrate-nitrogen from a target material in anaerobic and anoxic tanks, which are reaction tanks for removing phosphorus and nitrogen. If inflow water has low or insufficient concentration of organic materials, an additional reaction tank needs to be put after the aeration process to remove nitrogen, and methanol or acetic acid needs to be supplied as a supplementary source of organic carbon. If methanol or acetic acid is not decomposed during the denitrification, an additional aeration process is performed to completely decompose methanol or acetic acid. Therefore, if inflow water has an insufficient amount of carbon, additional costs are usually required to install additional denitrification and aeration tanks and purchase expensive pharmaceutical products such as methanol or acetic acid. Accordingly, another source of carbon that can replace methanol or acetic acid needs to be developed.

Methane gas is produced from organic waste landfills and anaerobic sludge hydration tanks in sewage treatment plants. In particular, methane gas is often considered as a global warming gas, and usually burnt in air. Thus, methane may be a cost-effective substitutional source of carbon for denitrification.

When methane is supplied into an aeration tank, which is an aerobic reaction tank, along with the air to use the methane as a source of carbon, methan-oxidizing bacteria start living and instigate sequential reactions as follows. First, methanotrophs converts the methane into an organic material such as methanol with use of oxygen dissolved in water. Second, methylotrophs reduces nitrate-nitrogen in water into nitrogen gas using the methanol as a source of carbon.

The conventional method is contrived to improve a nitrogen removal rate based on characteristics of methan-oxidizing bacteria, which usually grow in an aerobic condition. More specifically, in the activated sludge process using suspended microbes, inflow waste water, air, and methane gas are directly input into an aeration tank, and in a biological medium that uses adhering microbes, inflow waste water, air, and methane gas are directly input in a reaction tank. Therefore, in the conventional removal method of nitrogen and phosphorus based on methan-oxidizing bacteria, methan-oxidizing bacteria often grow along with bacteria used to remove organic materials expressed in COD and BOD, nitrogen-oxidizing bacteria used to oxidize ammoniac nitrogen. As a result, methan-oxidizing bacteria may not grow dominantly.

Since bacteria that oxidize organic materials grow faster than methan-oxidizing bacteria, reaction products such as methanol produced by methan-oxidizing bacteria (i.e., methanotrophs) are consumed first by bacteria that oxidize organic materials. Thus, a nitrogen removal rate of methylotrophs is low. Also, methan-oxidizing bacteria produced by methane gas generally produce more gelatinous materials such as extra polysaccharide (EPS) than the conventional suspended or adhering microbes by 10-fold or more. Thus, when biological media such as pebbles and ceramics are used, openings between the biological media are frequently closed. Methane gas is one of global warming gases and is explosive when methane gas of more than 5% exists in air. Hence, when the conventional method is employed, the concentration of discharge gas is high after a biological reaction; thus, the discharge gas may become explosive.

Accordingly, it is necessary to develop a method and an apparatus that allows dominant growth of methan-oxidizing bacteria, prevents closure of openings when a biological medium is used, and obtain a low concentration of methane in a discharge gas after a biological reaction in order to effectively use methane gas as a source of carbon for removing nitrogen.

SUMMARY OF THE INVENTION

Specific embodiments of the present invention are directed toward providing a method and an apparatus that allow an effective biological removal of nitrogen and phosphorus from polluted water.

In accordance with one aspect of the present invention, there is provided a method for biologically removing phosphorus and nitrogen, the method including, supplying a mixture gas into a gas holder, supplying inflow water and return water into the gas holder to make the mixture gas dissolved in the inflow water and the return water, the return water provided from a granulation biological reaction tank, transporting the inflow water and the return water including the dissolved mixture gas to the granulation biological reaction tank, removing a nitrogen-based component from the inflow water and the return water using methan-oxidizing bacteria granulated in the granulation biological reaction tank, transporting treated water without the nitrogen-based component to an anoxic tank, and treating and discharging the treated water from the anoxic tank.

In accordance with another aspect of the present invention, there is provided an apparatus for biologically removing phosphorus and nitrogen, the apparatus including a mixing tank used to provide a mixture gas, a granulation biological reaction tank comprising a pump for return water and a stirrer, the pump and the stirrer used to granulate methan-oxidizing bacteria; a gas holder connected with the granulation biological reaction tank and the mixing tank, supplied with inflow water and return water from the granulation biological reaction tank, and used to supply the mixture gas to the granulation biological reaction tank, and an anoxic tank connected with the granulation biological reaction tank and treating a nitrogen-based component of treated water using an organic material, the treated water transported from the granulation biological reaction tank.

DESCRIPTION OF SPECIFIC EMBODIMENTS

Figure 1:
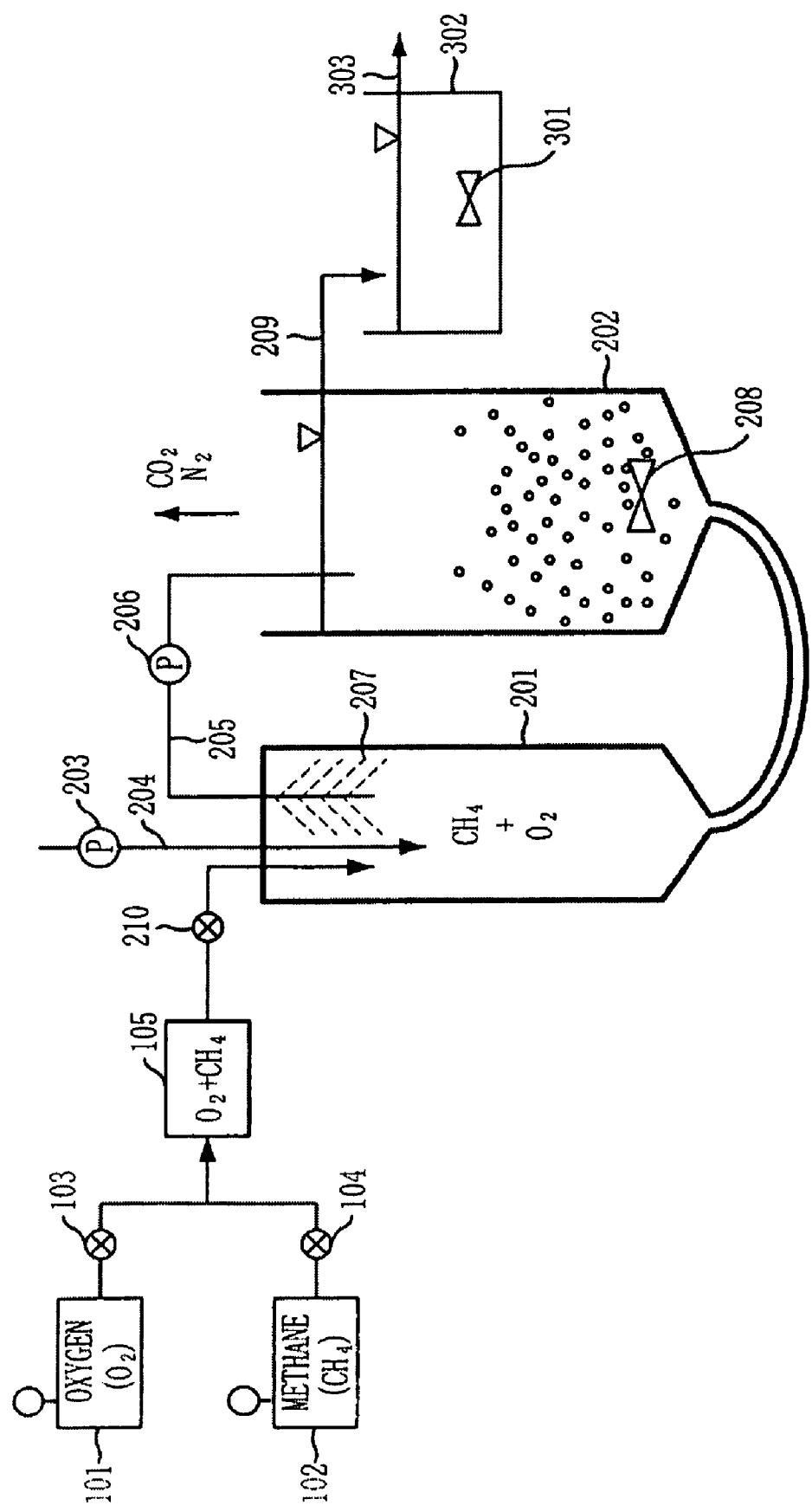
FIG. 1 illustrates an apparatus for biologically removing nitrogen and phosphorus using granulated methan-oxidizing bacteria in accordance with an embodiment of the present invention.

According to various embodiments of the present invention, a biological removal method of nitrogen and phosphorus using methan-oxidizing bacteria comprises mixing oxygen with methane gas and supplying the mixture gas into a gas holder for a biological reaction tank. The methane gas and oxygen are mixed together in a volumetric ratio of approximately 1 to 1 when compressed air is used, or approximately 1 to 0.5 when pure oxygen (e.g., gaseous oxygen or oxygen of more than 60%) is used in order to appropriately cultivate methan-oxidizing bacteria. This mentioned mixing ratio is only illustrative and should not be construed as being limited to the exemplary embodiments.

Inflow water is supplied into the gas holder to make the methane gas and oxygen dissolved in the inflow water, and the inflow water including the dissolved methane gas and oxygen is transported to a granulation biological reaction tank.

Instead of highly polluted waste water mixed with an organic material and a nitrogenous material, another type of water, for instance, treated water that includes a high content of nitrate-nitrogen without an organic material may be used as the inflow water. The treated water is obtained by decomposing an organic material and oxidizing a nitrogenous compound in an aeration tank of activated sludge, which is a typical biological treatment apparatus.

Methan-oxidizing bacteria can grow dominantly because methane gas, which is a source of carbon, is supplied into the granulation biological reaction tank to which the inflow water in which the methane gas and oxygen are dissolved is transported. In particular, according to the embodiment of the present invention, methan-oxidizing bacteria are allowed to consume a maximum amount of the methane gas provided as a source of carbon. Thus, a concentration of residual methane in a final discharge gas is low.

The method according to the embodiment of the present invention further comprise reducing nitrate-nitrogen of the inflow water to nitrogen gas using methan-oxidizing bacteria granulated in the granulation biological reaction tank. In detail, methanotrophs produce methanol when methane is supplied into a target in an aerobic condition, and methylotrophs remove nitrogen by reducing nitrate-nitrogen to nitrogen gas using the produced methanol as a source of carbon.

The present embodiment is based on the fact that methan-oxidizing bacteria contain lots of polysaccharides, which are viscous materials, to maximize the capability of methan-oxidizing bacteria in removing nitrogen and allow dominant growth of the methan-oxidizing bacteria. According to the present embodiment, granulated methan-oxidizing bacteria including highly concentrated microbes without a medium can be produced.

Methan-oxidizing bacteria are granulated when particles of methan-oxidizing bacteria continuously contact with each other based on vortex as a main power source and stirring power of a stirrer configured in the granulation biological reaction tank as a supplementary power source. The vortex is generated by hydraulic power of a pump that transports return water to the gas holder. The stirring power of the stirrer has a stirring rate in a range of approximately 10 rpm to 20 rpm. If the stirring rate is less than approximately 10 rpm, granulated sludge is likely to sink to the bottom. On the other hand, if the stirring power is more than approximately 20 rpm, a layer of granulated sludge is likely to expand excessively.

After the methylotrophs reduce nitrate-nitrogen to nitrogen gas in the granulation biological reaction tank, the inflow water in the granulation biological reaction tank returns to the gas holder. Methane gas and oxygen are dissolved again in the return water in the gas holder, so that the methane gas and the oxygen are consumed.

After the reduction of the nitrate-nitrogen to the nitrogen gas, the nitrate-nitrogen in the inflow water and the return water may also be removed by being additionally reduced to nitrogen gas by using methan-oxidizing bacteria adhering to the surface of a medium including hollow fiber synthetic membranes. In such a case, the nitrate-nitrogen can be consecutively removed without closing a biological medium using polysaccharides.

The hollow fiber synthetic membranes that may be additionally used to remove the nitrogen and phosphorus include a synthetic high polymer such as polyethylene or polypropylene. The hollow fiber synthetic membranes are hollow inside, and may be typical microfiltration membranes having a diameter of approximately 0.5 mm to 1 mm. When the diameter of the hollow fiber synthetic membranes is within the range of the aforementioned diameter, the specific surface area of a portion to which microbes adhere becomes large due to the small diameter. The hollow fiber synthetic membranes may be hollow inside and formed in the shape of individually stranded bobbins. In such a case, buoyancy and flow rate, which are created when the inflow water flows upstream, cause bobbins of the hollow fiber synthetic membranes to be separated from each other, so that the hollow fiber synthetic membranes are not closed even though methan-oxidizing bacteria adhere to the surface of the hollow fiber synthetic membranes.

After the nitrate-nitrogen is discharged through the above described processes, the treated water removed of the nitrate-nitrogen is transported to an anoxic tank, treated again, and discharged thereafter.

With reference to the accompanying drawings, the biological removal method of nitrogen and phosphorus and the apparatus therefor will be described in detail. Like reference numerals denote like elements even in different drawings.

Referring to FIG. 1, supply valves 103 and 104 are opened to allow a compressed oxygen or air in a first storage tank, compressed by a compressor, and a compressed methane gas in a second storage tank 102 to be mixed at a volumetric ratio of approximately 0.5 to 1 or approximately 1 to 1 in a mixing tank 105. The mixture gas is supplied into a gas holder 201 for a biological reaction tank.

An upper portion of the gas holder 201 is sealed to disallow air from the outside to penetrate into the gas holder 201. Thus, because of injection pressure created when the mixture gas is supplied into the gas holder 201, a hydraulic level of the gas holder 201 descends, while a hydraulic level of a granulation biological reaction tank 202 ascends. When inflow water 204 containing abundant nitrate-nitrogen and return water 205 returned from the granulation biological reaction tank 202 are supplied into the gas holder 201 through respective pumps 203 and 206, the methane gas and the oxygen contained inside the gas holder 201 are dissolved in the inflow water 204 and the return water 205, and transported to the granulation biological reaction tank 202. The return water 205 transported from the granulation biological reaction tank 202 to the gas holder 201 is sprayed through a spray type nozzle 207 to make the methane gas and the oxygen dissolved evenly in the inflow water 204 and the return water 205.

Methanotrophs covert the methane gas and the oxygen transported to the granulation biological reaction tank 202 into methanol and carbon dioxide using the dissolved oxygen. Methylotrophs remove nitrogen by converting the nitrate-nitrogen contained in the inflow water 204 into nitrogen gas using the produced methanol. Therefore, nitrogen and carbon dioxide decomposed by the methan-oxidizing bacteria are discharged from an upper portion of the granulation biological reaction tank 202. The methane gas and the oxygen in the gas holder 201 are transported to the return water 205 to be consumed, and thus, a partial pressure of the oxygen and methane gas gradually decreases, followed by an increase in a hydraulic level of the gas holder 201.

When the hydraulic level of the gas holder 201 reaches the maximum, a valve 210 of the mixing tank 105 is opened to provide the oxygen and the methane gas until the hydraulic level of the gas holder 201 reaches the minimum. The methane gas aid the oxygen are used until being consumed away by occasionally supplying the methane gas and the oxygen, so than methane is not carried away in the discharge gas of the granulation biological reaction tank 202.

The methan-oxidizing bacteria are granulated in the granulation biological reaction tank 202 with use of vortex, which is generated by hydraulic power of the pump 206 that transports the return water 205 to the gas holder 201, as a main power source, and stirring power of a mechanical stirrer 208 as a supplementary power source. In particular, the granulation of the methan-oxidizing bacteria takes place due to continuous contact between the microbic particles of the methan-oxidizing bacteria having high contents of gelatinous/viscous materials such as polysaccharides.

Figure 2:
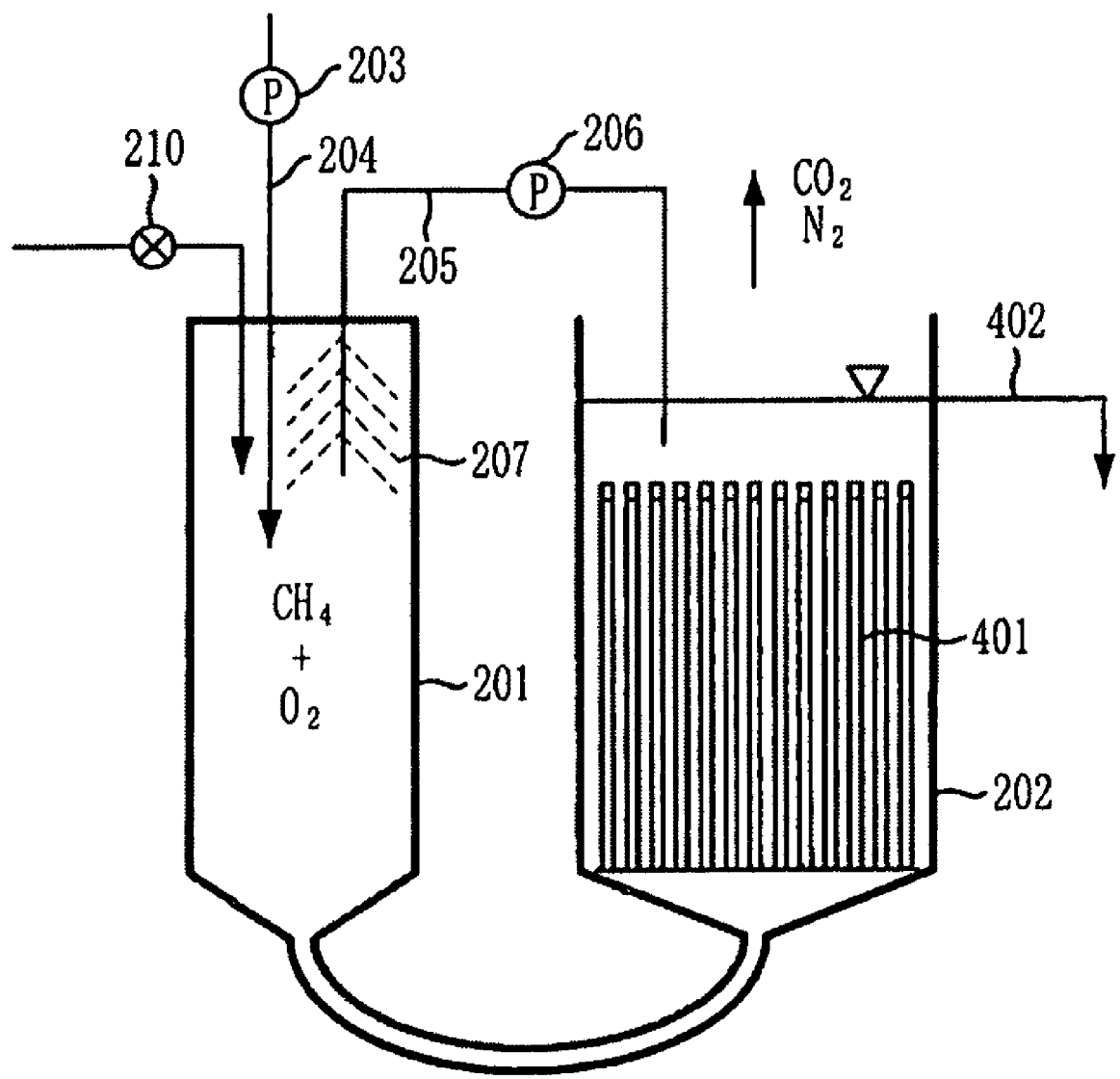
FIG. 2 illustrates a granulated biological reaction tank part installed with a biological medium including hollow fiber synthetic membranes.

Referring to FIG. 2, if the biological removal method of nitrogen and phosphorus based on the granulation of the methan-oxidizing bacteria further uses hollow fiber synthetic membranes 401 as a medium for adhering microbes to a target, supplying a mixture gas of methane gas and oxygen through a valve 210, supplying inflow water 204, and supplying return water 205 are substantially the same as the granulation method of methan-oxidizing bacteria illustrated in FIG. 1. FIG. 2 does not illustrate the same or like parts of the apparatus illustrated in FIG. 1.

More specifically, the methan-oxidizing bacteria containing high contents of gelatinous/viscous materials such as polysaccharides use hollow fiber synthetic membranes 401 as a medium that can adhere to a target without closure. Since hollow fiber synthetic membranes generally have a diameter of approximately 0.5 mm to 1 mm and are lightweight due to the hollowness inside, when the return water 205 is transported upstream, the hollow fiber synthetic membranes 401 stand upright in the flow direction of the return water 205. As a result, the hollow fiber synthetic membranes 401 do not overlap with each other. The methane gas and the dissolved oxygen are evenly supplied in the flow direction of the return water 205, and thus, the methan-oxidizing bacteria evenly adhere to the surface of the hollow fiber synthetic membranes 401.

Treated water 209 (see FIG. 1) and another treated water 402 (see FIG. 2) that pass through the granulated methan-oxidizing bacteria include methanol that is not decomposed. The treated water 209 and the other treated water 402 are treated again in an anoxic tank 302 installed with a stirrer 301 (see FIG. 1) so as to be re-used as a source of carbon. Afterward, the treated water 209 and the other treated water 402 that pass through the anoxic tank 302 are discharged. Reference numeral 303 denotes finally treated water after the above discharge event.

Hereinafter, specific embodiments of the present invention will be described in detail. The specific embodiments are only illustrative and should not be construed as limitation to the present invention.

Specific Embodiment 1

When methane was supplied as a source of carbon into each of the reaction tanks using the apparatus (see FIG. 1) including the granulation biological reaction tank 202 where methan-oxidizing bacteria are granulated, an effective removal rate of nitrate-nitrogen and phosphorus and an amount of methane, which is one global warming gas, in a discharge gas were measured. For inflow water, treated water, which was treated to have a high concentration of nitrate-nitrogen by removing an organic material and oxidizing ammoniac nitrogen, was added additionally with $KNO_3$ as a nitrate-nitrogen component and $KH_2PO_4$ as a soluble phosphorus component.

The inflow water was supplied at a rate of approximately 100 L per day. The inflow water was stayed at the granulation biological reaction tank 202 for approximately 3 hours, and at the anoxic tank 302 for approximately 2 hours to use methanol as a source of carbon. The methanol is residual methanol obtained after being consumed at the granulation biological reaction tank 202. Methane gas of approximately 99% and oxygen of approximately 99% were supplied into the individual reaction tanks using a compressed gas, and mixed at a volumetric ratio of approximately 1 to 1, so that a content ratio of the mixture gas is maintained at approximately 50% to 50%.

The mixture gas was supplied till reaching a minimum hydraulic level of the gas holder 201 using the pressure of the mixing tank 105, and transported to the granulation biological reaction tank 202 by the return water 205, so as to consume the methane gas and the oxygen. The mixture gas was supplied again into the gas holder 201 till reaching a maximum hydraulic level of the gas holder 201, thereby supplying the mixture gas occasionally. Table 1 below shows the result of Specific Embodiment 1 of the present invention. In particular, the result values are average values of the tests performed for approximately 1 month.

Specific Embodiment 2

With use of the apparatus (See FIG. 2) additionally including the biological reaction tank 202 installed with hollow fiber synthetic membranes 401 based on a polypropylene material having a diameter of approximately 1 mm, processes substantially the same as the process described in Specific Embodiment 1 are performed. The result of Specific Embodiment 2 is shown in Table 1 below.

Comparative Example

Efficiency of removing nitrogen and phosphorus and an amount of methane in a discharge gas were measured using the conventional activated sludge method. Approximately 300 mL of methane gas was supplied into the conventional activated sludge aeration tank for every minute. The conventional activated sludge aeration tank generally runs by supplying air. The methane gas was used as a source of carbon for removing oxygen and nitrogen. A mechanical stirrer was used to completely mix the activated sludge with the methane gas. A hydraulic stay time of the methane gas in the activated sludge aeration tank was approximately 6 hours, and inflow water whose quality was substantially the same as that of the inflow water used in Specific Embodiments 1 and 2 was used.

TABLE 1

| Type | Test Items | COD (mg/L) | BOD (mg/L) | $NO_3^-$—N (mg/L) | S—P (mg/L) | Methane (%) |
|---|---|---|---|---|---|---|
| Comparative Example | Inflow water | 8 | 5 | 40 | 10 | 50 |
|  | Final treated water | 5 | 3 | 32 | 8 | — |
|  | Process efficiency (%) | — | — | 20 | 25 | — |
|  | Discharge gas | — | — | — | — | 35 |
| Specific Embodiment 1 | Inflow water | 8 | 5 | 40 | 10 | 50 |
|  | Treated water in granulation biological reaction tank | 35 | 22 | 12 | 2 | — |
|  | Final treated water | 5 | 2 | 3 | 1 | — |
|  | Process efficiency (%) | — | — | 93 | 90 | — |
|  | Discharge gas | — | — | — | — | Not detected |
| Specific Embodiment 2 | Inflow water | 8 | 5 | 40 | 10 | 50 |
|  | Treated water in granulation biological reaction tank with membrane-based medium | 25 | 18 | 10 | 1.8 | — |
|  | Final treated water | 3 | 2 | 2 | 1.0 | — |
|  | Process efficiency (%) | — | — | 95 | 90 | — |
|  | Discharge gas | — | — | — | — | Not detected |

As shown, for Comparative Example illustrating the use of the conventional activated sludge method had low removal efficiency (i.e., process efficiency) of nitrate-nitrogen and phosphorus measured at approximately 20% and 25%, respectively. A non-reacted methane gas in the discharge gas was approximately 35%. This measurement is considered high, indicating flammability. In the activated sludge method, when the methane gas is supplied, aerobic activated sludge bacteria and methane-oxidizing bacteria compete with each other. Thus, it is difficult for the methan-oxidizing bacteria to grow dominantly.

Removal efficiency of nitrate-nitrogen and phosphorus according to Specific Embodiments 1 and 2 was higher than that according to Comparative Example. Each of the measured removal efficiency of nitrate-nitrogen and phosphorus in Specific Embodiments 1 and 2 was more than approximately 90%. A non-reacted methane gas did not exist in the discharge gas. This result might be obtained because of dominant growth of the methan-oxidizing bacteria and the occasional supply of methane, which caused the methane gas and the oxygen to be dissolved in the return water, and proceeded until the methane in the gas holder was consumed (i.e., increase in a hydraulic level of the gas holder). A more efficient removal of nitrogen could be achieved by recycling methanol produced in the granulation biological reaction tank and the hollow fiber synthetic membrane-based reaction tank as a source carbon for the anoxic activated sludge process. As compared with the case in which methane was supplied according to the activated sludge method, phosphorus was removed with improved efficiency because of the adherence of polysaccharides.

According to various embodiments of the present invention, methan-oxidizing bacteria are allowed to grow dominantly. As a result, efficiency of removing nitrogen and phosphorus can be improved. An occasional gas supply procedure allows an amount of residual methane in a discharge gas to decrease to a great extent. According to the occasional gas supply procedure, a compressed gas of methane and oxygen is transported to the biological reaction tank, so that the compressed gas is dissolved and cycled in the target reaction tank. This cycle of the compressed gas leads to the exhaustion of the compressed gas, thereby resulting in a decrease in the pressure. Afterwards, the compressed gas is supplied again into another target reaction tank. Also, efficiency of removing nitrogen can be improved by recycling methanol produced in the granulation biological reaction tank as a source of carbon for the anoxic activated sludge method.

While the present invention has been described with respect to illustrative embodiments, it will be apparent to those skilled in the art that various changes and modifications may be made without departing from the spirit and scope of the invention as defined in the following claims.

What is claimed is:

1. An apparatus for biologically removing phosphorus and nitrogen, the apparatus comprising:
   a mixing tank used to provide a mixture gas; a granulation biological reaction tank comprising a pump for return water and a stirrer, the pump and the stirrer used to granulate methane-oxidizing bacteria;
   a gas holder connected with the granulation biological reaction tank and the mixing tank, supplied with inflow water and return water from the granulation biological reaction tank, and used to supply the mixture gas to the granulation biological reaction tank;
   and an anoxic tank connected with the granulation biological reaction tank and treating a nitrogen-based component of treated water using an organic material, the treated water transported from the granulation biological reaction tank.

2. The apparatus of claim 1, wherein the mixture gas comprises methane gas and oxygen.

3. The apparatus of claim 1, wherein the pump and the stirrer are used to make particles of the methane-oxidizing bacteria collide with each other to thereby induce granulation of the methane-oxidizing bacteria.

4. The apparatus of claim 1, wherein the nitrogen-based component comprises nitrate-nitrogen.

5. The apparatus of claim 1, wherein the organic material comprises methanol remaining in the treated water.

6. The apparatus of claim 1, wherein the gas holder comprises a nozzle helping the mixture gas to be supplied uniformly in a soluble state in the return water provided from the granulation biological reaction tank.

7. The apparatus of claim 1, further comprising another granulation biological reaction tank installed with a biological medium comprising hollow fiber synthetic membranes.

8. The apparatus of claim 1, wherein the inflow water supplied into the gas holder is treated water having the high content of the nitrogen-based component by decomposing the organic material and oxidizing another nitrogen-based component through performing an aeration process.

9. The apparatus of claim 8, wherein the other nitrogen component comprises ammoniac nitrogen.

* * * * *